United States Patent [19]

Gleim

[11] Patent Number: 4,899,093
[45] Date of Patent: Feb. 6, 1990

[54] CIRCUITRY FOR ELECTRONICALLY COMMUTATING A DIRECT-CURRENT MOTOR

[75] Inventor: Günter Gleim, Villingen-Schwenningen, Fed. Rep. of Germany

[73] Assignee: Deutsche-Thomson Brandt GmbH, Villingen, Fed. Rep. of Germany

[21] Appl. No.: 192,519

[22] PCT Filed: Sep. 2, 1987

[86] PCT No.: PCT/EP87/00494
§ 371 Date: Apr. 29, 1988
§ 102(e) Date: Apr. 29, 1988

[87] PCT Pub. No.: WO88/01807
PCT Pub. Date: Mar. 10, 1988

[30] Foreign Application Priority Data
Sep. 5, 1986 [DE] Fed. Rep. of Germany ....... 3630312

[51] Int. Cl.[4] .............................................. H02P 6/02
[52] U.S. Cl. .................................... 318/254; 318/138; 318/480
[58] Field of Search ............... 318/138, 254, 313, 318, 318/439, 480

[56] References Cited

U.S. PATENT DOCUMENTS

| | | | |
|---|---|---|---|
| 4,223,261 | 9/1980 | White | 318/313 X |
| 4,320,330 | 3/1982 | Bahr et al. | 318/254 X |
| 4,507,590 | 3/1985 | Miyazaki | 318/313 X |
| 4,511,797 | 4/1985 | Pohlig et al. | 318/480 X |
| 4,525,657 | 6/1985 | Nakase et al. | 318/313 X |
| 4,551,715 | 11/1985 | Durbin | 318/313 X |

*Primary Examiner*—Bentsu Ro
*Attorney, Agent, or Firm*—Max Fogiel

[57] ABSTRACT

A circuit arrangement for electronically commutating a multi-phase direct-current motor, in which a predetermined number of markers are distributed around the circumference of the rotor. A sensor detects the markers and generates corresponding commutating pulses to activate the phase windings of the motor. The commutating pulses advance a counter which has a plurality of outputs. These outputs control switches that connect the phase windings alternately to an operating voltage and to a reference voltage. The counter resets itself to zero after receiving a predetermined number of commutating pulses that is a whole-number divisor of the number of markers. A special marker is provided for resetting the counter from the outside, so that the stator applies a torque to the rotor which is always optimum and phase displacement is prevented.

11 Claims, 5 Drawing Sheets

FIG. 1

CIRCUITRY FOR ELECTRONICALLY COMMUTATING A DIRECT-CURRENT MOTOR

BACKGROUND OF THE INVENTION

The invention concerns circuitry for electronically commutating a multiphase direct-current motor, whereby markers are distributed around the circumference of a rotor, the markers provide, in conjunction with a sensor, the commutating pulses that activate the motor's phase conductors, the pulses supplied by the sensor advance a counter that has output terminals, the output terminals control switches that switch the phase conductors alternately to operating and to reference voltage, and the counter re-zeroes itself after a certain number of pulses. Circuitry of this type is known. It is described for example in German OS No. 3 435 270. Its purpose is to activate the motor's various phase conductors at appropriate instants. The markers on the circumference of the rotor can be light-permeable or reflecting points that operate in conjunction with light-sensitive sensors or they can be permanent magnets that act on a sensor in the form of a Hall generator. The markers generate a periodic sequence of pulses that activate the phase conductors, which a counter cyclically connects by way of bipolar switches to either operating voltage or reference voltage. The sequence is constructed when the counter re-zeroes itself subsequent to a certain number of pulses that is a whole-number divisor of the number of markers.

Sometimes, however, the counter will re-zero itself a pulse too early or too late, preventing optimum activation of the phase conductors. It is then no longer possible to attain optimum torque, and the efficiency of the motor is detrimentally affected.

SUMMARY OF THE INVENTION

The object of the invention is to ensure that the motor will always be at optimum torque.

This object is attained by way of the invention recited in the major claim. Further embodiments that attain the invention will be evident from the subsidiary claims.

The invention will now be described with reference to a head-drum motor for a videorecorder.

BRIEF DESCRIPTION OF THE DRAWINGS

FIG. 1 illustrates a circuit for electronic commutation,

DESCRIPTION OF THE PREFERRED EMBODIMENTS

Figure 1:
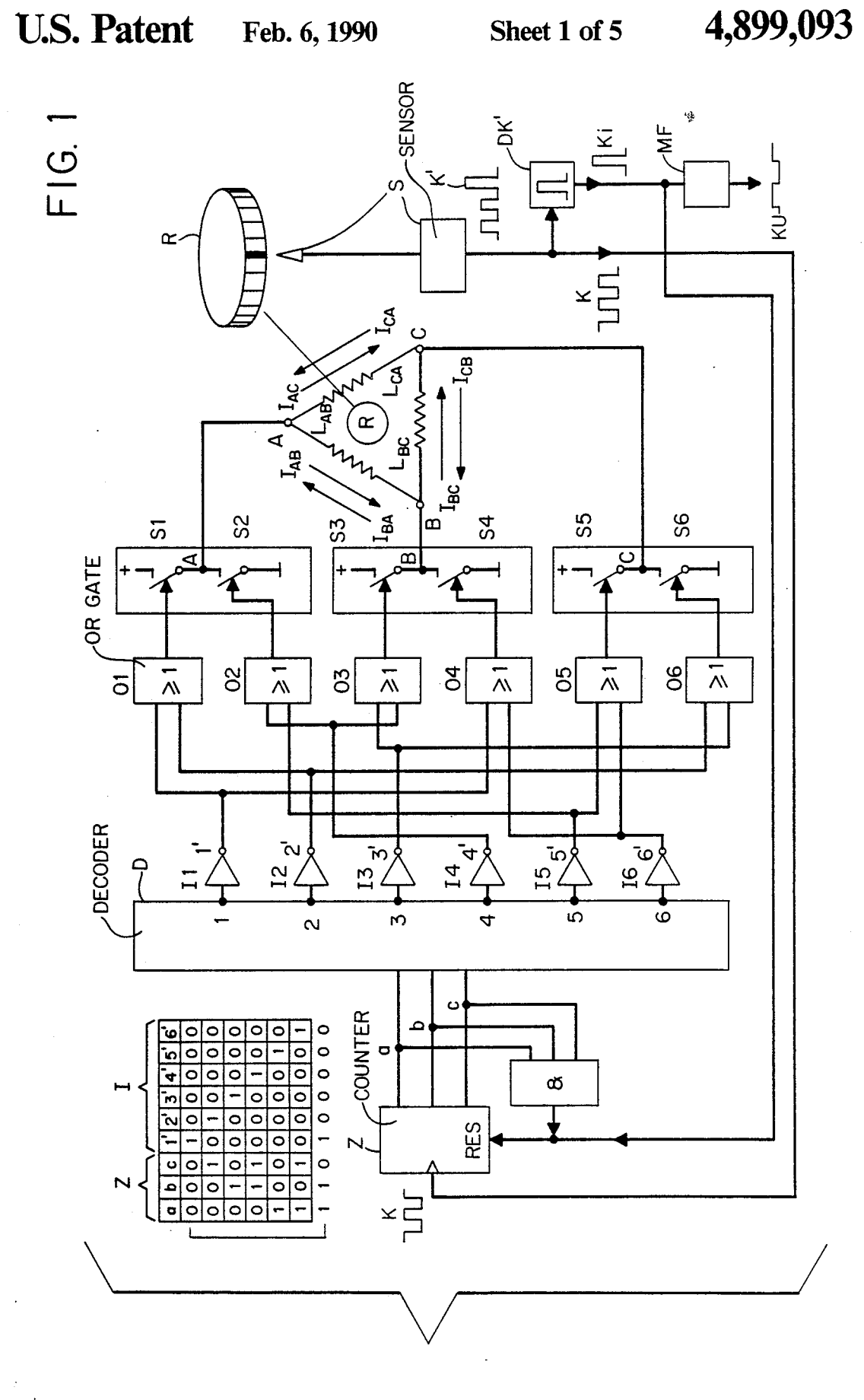

The invention is illustrated in FIG. 1 by way of a circuit for commutating the head-drum motor in a videorecorder. The motor in the illustrated example has a stator with three phase belts $L_{AB}$, $L_{BC}$, and $L_{CA}$, which drive a rotor in that the currents that flow into the belts act on permanent magnets mounted on the rotor. Rotor R is provided with markers M that commutate the motor in that they are associated with a sensor S that detects them and derives commutating pulses K from them. Indices M may consist of small magnets that operate in conjunction with a sensor in the form of a Hall generator. Indices M can also be light-permeable or reflecting points that operate in conjunction with an optical scanner or light barrier. The markers can also be magnets that operate in conjunction with a magnetic resistor. Commutating pulses K arrive at the input terminal of a counter Z that re-zeroes itself subsequent to a number of incoming pulses. This occurs in conjunction with a logic circuit L that creates a re-zeroing pulse from a desired terminal position on the part of the counter. The number x of counter pulses needed to re-zero counter Z equals a whole-number divisor of the number N of markers M on rotor R. The illustrated example utilizes 24 markers M to commutate the motor. Counter Z can for example be a synchronized BCD counter such as the Texas Instruments SN 74192. For $x=6$, counter Z will re-zero subsequent to 6 incoming pulses, on the occurrence of the seventh pulse, that is. The outputs from counter Z arrive in a decoder circuit D (e.g Texas Instruments 74/54) that supplies a pulse in cyclical sequence to each of its output terminals 1 through 6 whenever a commutating pulse K arrives at the input terminal of counter Z. The output terminals 1 through 6 of decoder circuit D are associated by way of inverter stages I1 through I6 and of OR-gates 01 through 06 in such a way that their output terminals activate switches S1 through S6 so that the requisite currents will flow into phase belts $L_{AB}$, $L_{BC}$, and $L_{CA}$.

Figure 2:
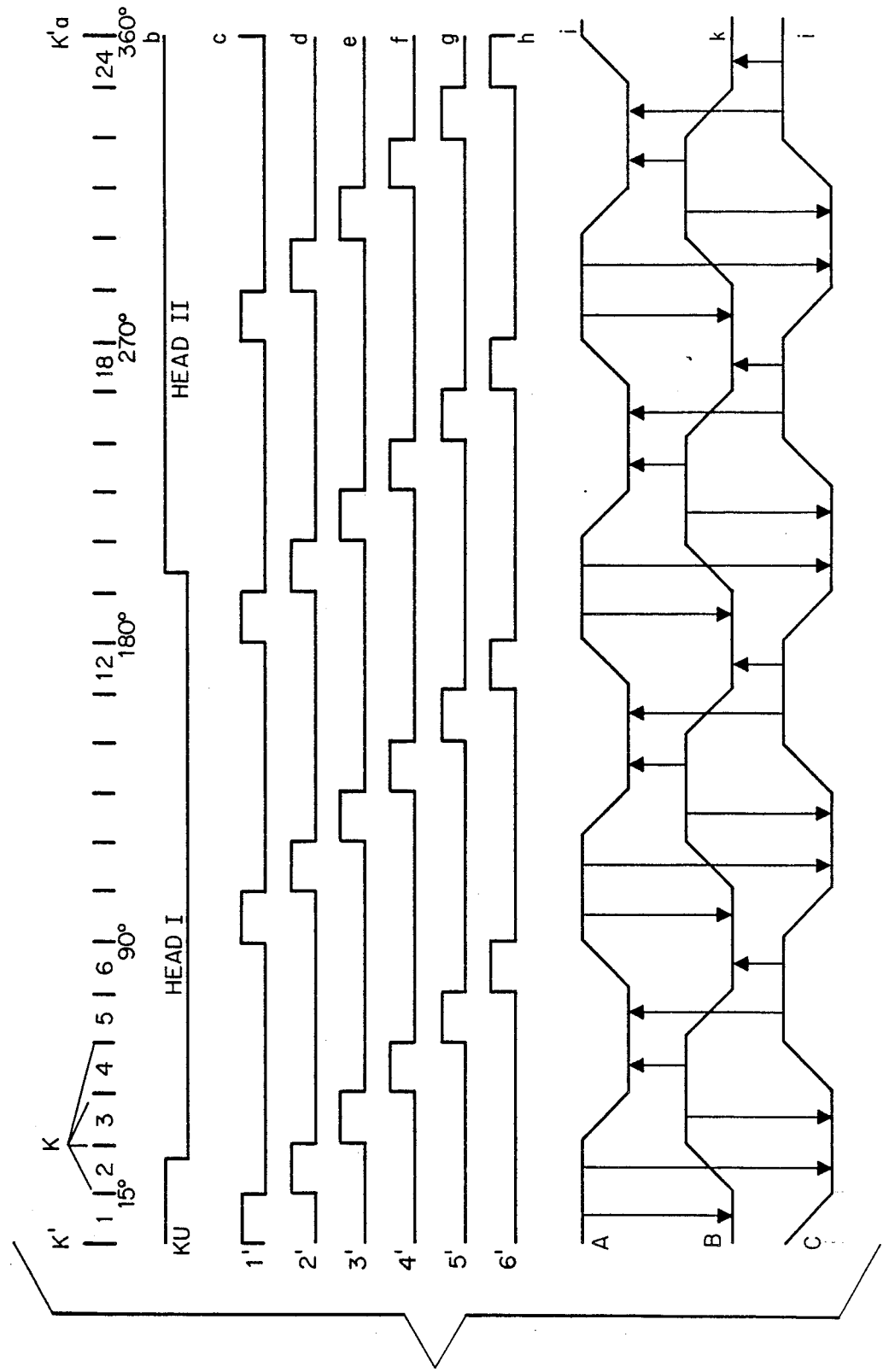
FIGS. 2, 3, and 4 are graphs that explicate FIG. 1.

FIG. 2 is a graph illustrating the chronological relation between the voltages at points A, B, and C. Plotted in FIG. 2a is the sequence of pulses deriving from sensor S during one rotation of rotor R. It consists of 24 commutating pulses K that create 24 beats. One pulse K' in the series is employed to construct a head-switching pulse KU (FIG. 2b) for example, in conjunction with a monostable flip-flop MF.

The pulses illustrated in FIGS. 2c through 2h represent the output signals from decoder-circuit output terminals 1 through 6 as inverted by inverter stages I1 through I6. The curves in FIGS. 2i, 2k, and 2l represent the voltages at the points A, B, and C in FIG. 1.

At the first beat, output terminal A is provided with a positive voltage by closing switch S1, and output terminal C with reference voltage by closing switch S4, allowing a current $I_{AB}$ to flow. At the second beat, switches S1 and S6 are closed, allowing a current $I_{AC}$ to flow. Cyclic advancing of output terminals 1 through 6 provides currents $I_{BC}$, $I_{BA}$, and $I_{CB}$, subsequent to which the sequence 1 through 6 is repeated. Switches S1 through S6 are for simplicity's sake illustrated as mechanical switches, although they are actually of course electronic switches like transistors or switch current sources.

Sometimes, even though the motor is rotating in the correct direction, counter Z will re-zero a beat too early or too late. In this case, the appropriate phase belts $L_{AB}$, $L_{BC}$, and $L_{CA}$ will not be supplied with current and optimum torque will be impossible.

Figure 3:
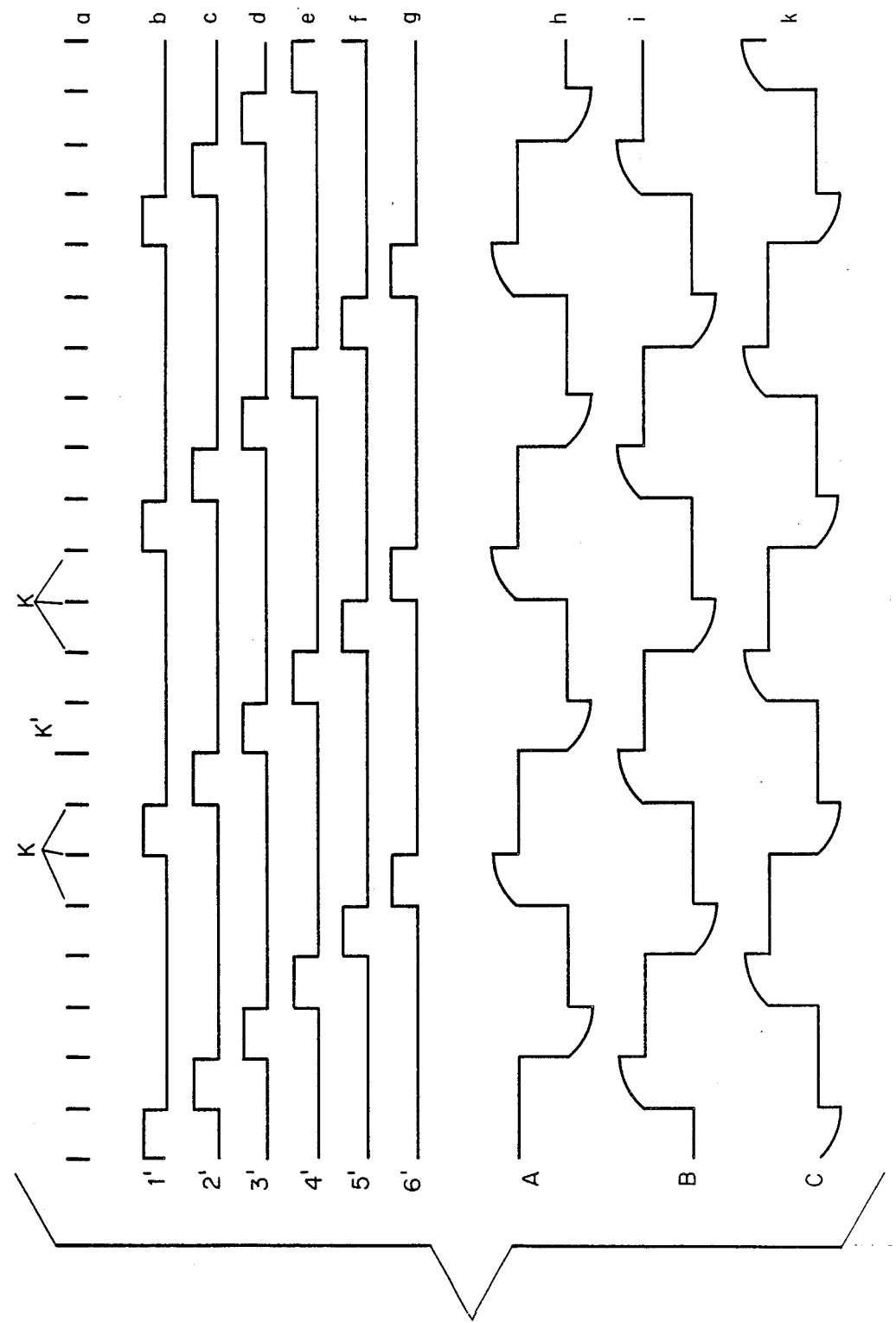

FIG. 3 illustrates the effects of such a deleterious re-zeroing of the counter. The pulses at the output terminals 1' to 6' of inverter stages I1 through I6 illustrated in FIGS. 3b through 3g will be displaced one beat in relation to the pulses illustrated in FIG. 3a. The chronological activating voltages illustrated in FIGS. 3h through 3k as necessary for optimum torque will accordingly not occur at the points A, B, and C of the circuit illustrated in FIG. 1.

Figure 4:
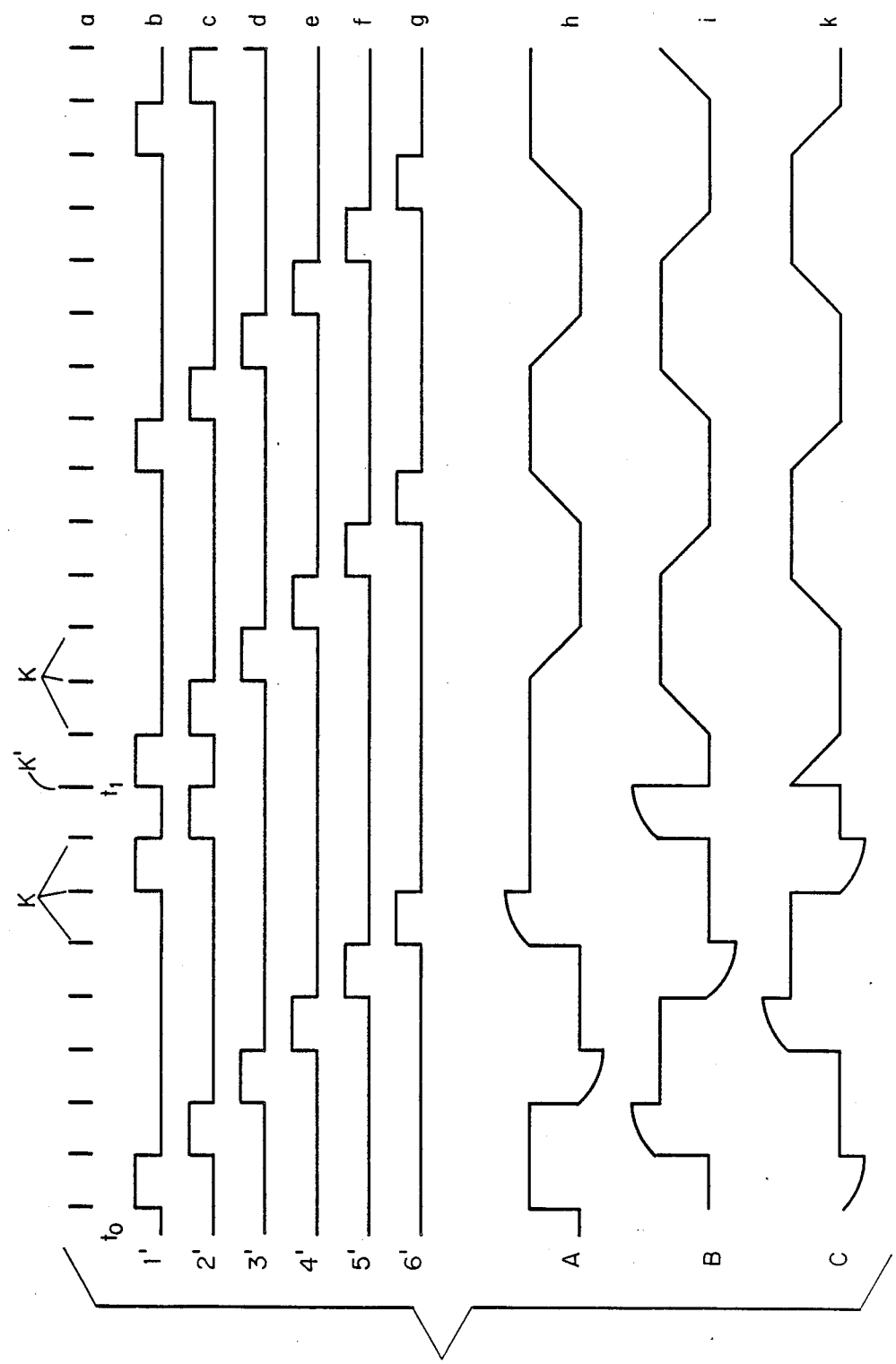

FIG. 4 illustrates the effect of the invention.

The motor begins to rotate at time $t_0$, and the first marker M to travel past sensor S releases a commutating pulse K, advancing counter Z. The output signals 1' through 6' at inverter stages I1 through I6 are plotted in FIGS. 4b through 4g. The situation is identical with that illustrated in FIG. 3 until time $t_1$. As of time $t_1$ counter Z is compulsorily re-zeroed, and the originally inappropriate activation illustrated in FIGS. 4a, 4i, and 4k will as of that point of time change to the desired type. This state is attained no later than subsequent to one revolution of the motor.

Figure 5:
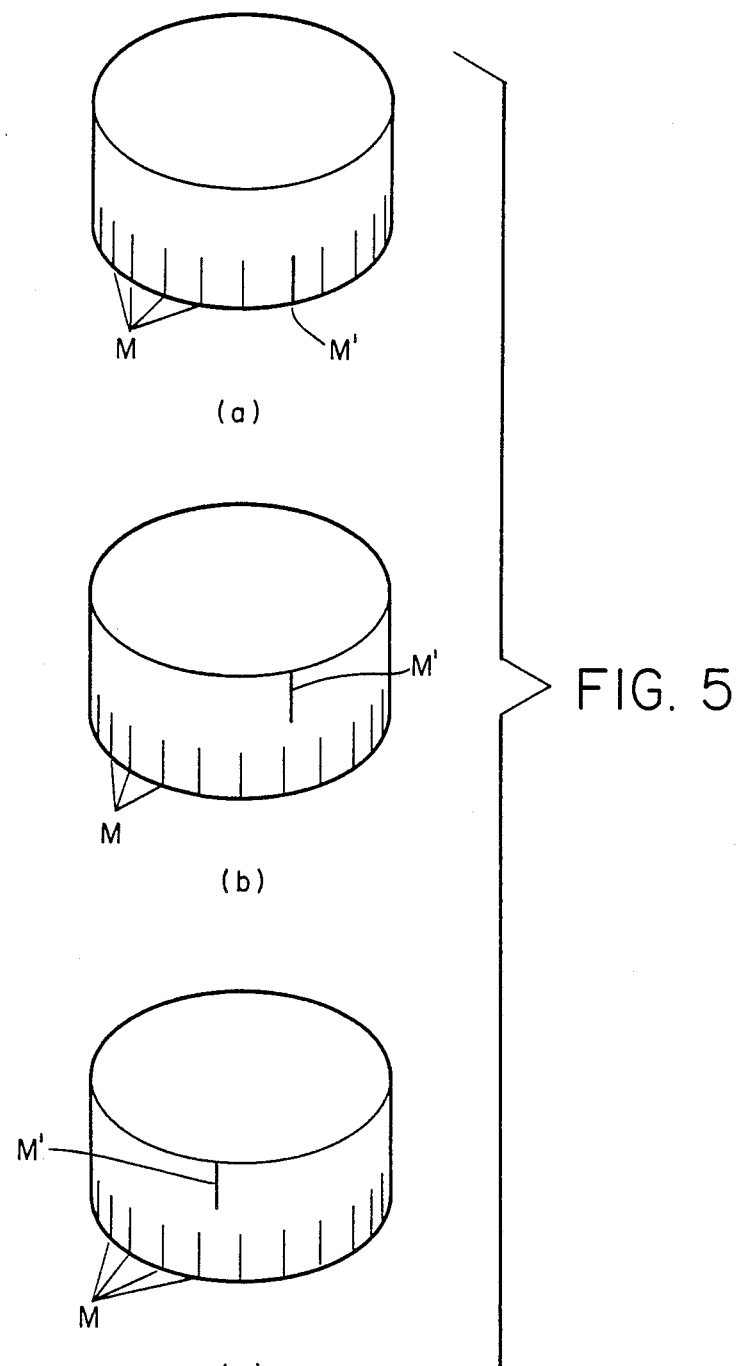
FIG. 5 illustrates various means of attaining the object of the invention.

FIG. 5 illustrates three different ways of distributing additional markers M'. The special marker M' illustrated in FIG. 5a is identical with the marker that generates the head-switching pulses. The special marker M' illustrated in FIG. 5b is positioned in another row outside commutating markers M. The special markers M' can also be located between commutating markers M as illustrated in FIG. 5c, in which case they are utilized to generate a readying signal for re-zeroing counter Z, which is carried out by a chronologically subsequent commutating pulse. It is also possible to exploit some of markers M to commutate the motor.

I claim:

1. A circuit for electronically commutating a multiphase direct-current motor having a stator and a rotor with a circumference, comprising: a predetermined number of markers distributed around said circumference of said rotor; said motor having phase windings; a sensor for detecting said markers and generating corresponding commutating pulses to activate said phase windings; a counter advanced by said pulses, said counter having a plurality of outputs; a plurality of switches controlled by said outputs for connecting said phase windings alternately to an operating voltage and to a reference voltage; said counter resetting itself to zero after receiving a predetermined number of commutating pulses that is a whole-number divisor of said predetermined number of markers; and an additional marker on said stator for resetting said counter from outside of said counter so that said stator applies a torque to said rotor which is always optimum and phase displacement is prevented.

2. A circuit as defined in claim 1, wherein said additional marker is positioned outside said markers distributed around said circumference of said rotor.

3. A circuit as defined in claim 1, wherein said additional marker has an angular position coinciding with an angular position of one of said markers distributed around said circumference of said rotor.

4. A circuit as defined in claim 2, wherein said additional marker is positioned at an arbitrary location relative to said markers distributed around said circumference of said rotor; said additional marker applying to said counter an additional resetting pulse executed by the next one of the arriving markers distributed around said circumference of said rotor.

5. A circuit as defined in claim 1, wherein a plurality of additional markers are distributed around said circumference of said rotor.

6. A circuit as defined in claim 3, wherein said additional marker is identical to one of said markers distributed around said circumference of said rotor, said additional marker differing from the remaining markers distributed around the circumference of said rotor in structural dimensions.

7. A circuit as defined in claim 1, wherein said additional marker is identical to one of the markers distributed around the circumference of said rotor, said additional marking differing from the remaining markers distributed around the circumference of said rotor by being permeable to light.

8. A circuit as defined in claim 5, wherein said additional marker is identical to one of the markers distributed around the circumference of said rotor, said additional marker having a reflectivity factor differing from the reflectivity factor of the remaining markers distributed around the circumference of said rotor.

9. A circuit as defined in claim 1, wherein said direct current motor comprises a head-drum motor in a videorecorder.

10. A circuit as defined in claim 9, wherein said additional marker provides a head-switching signal.

11. A circuit for electronically commutating a multiphase direct-current motor having a stator and a rotor with a circumference, comprising: a predetermined number of markers distributed around said circumference of said rotor; said motor having phase windings; a sensor for detecting said markers and generating corresponding commutating pulses to activate said phase windings; a counter advanced by said pulses, said counter having a plurality of outputs; a plurality of switches controlled by said outputs for connecting said phase windings alternately to an operating voltage and to a reference voltage; said counter resetting itself to zero after receiving a predetermined number of commutating pulses that is a whole-number divisor of said predetermined number of markers; and an additional marker on said rotor for resetting said counter from outside of said counter so that said stator applies a torque to said rotor which is always optimum and phase displacement is prevented; said additional marker being positioned outside said markers distributed around the circumference of said rotor; said additional marker having an angular position coinciding with the angular position of one of the markers distributed around the circumference of said rotor; said additional marker being identical to one of the markers distributed around the circumference of said rotor, said additional marker differing from the remaining markers distributed around the circumference of said rotor in structural dimensions, permeability to light, and reflectivity.

* * * * *